Nov. 1, 1960 H. L. GIWOSKY 2,958,470
DEVICE FOR MOVING IRRIGATING UNITS
Filed Sept. 22, 1958 4 Sheets-Sheet 1

INVENTOR.
HARRY L. GIWOSKY
BY
John W. Michael
ATTORNEY

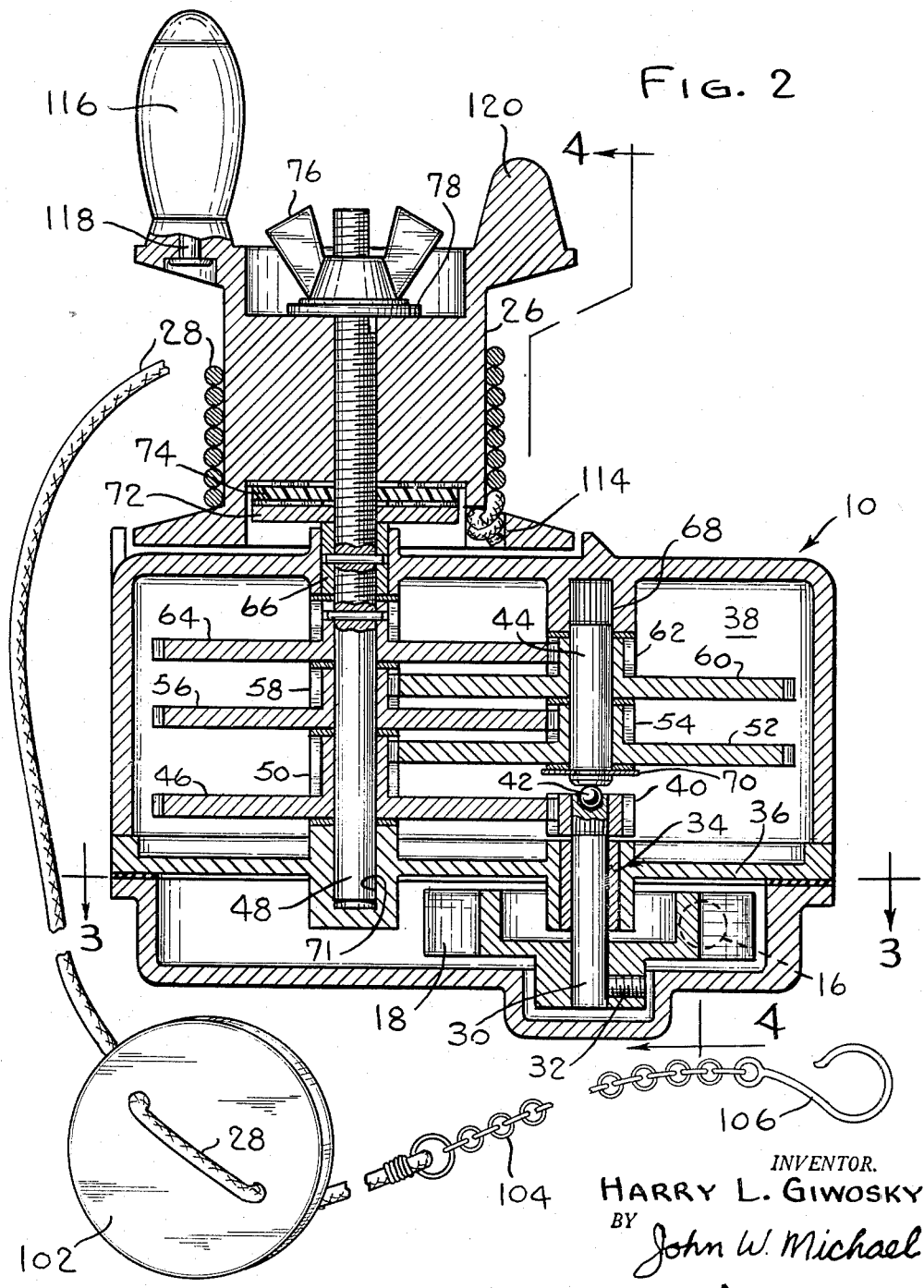

Nov. 1, 1960

H. L. GIWOSKY 2,958,470

DEVICE FOR MOVING IRRIGATING UNITS

Filed Sept. 22, 1958

INVENTOR.
HARRY L. GIWOSKY
BY John W. Michael
ATTORNEY

Nov. 1, 1960  H. L. GIWOSKY  2,958,470
DEVICE FOR MOVING IRRIGATING UNITS
Filed Sept. 22, 1958  4 Sheets-Sheet 4
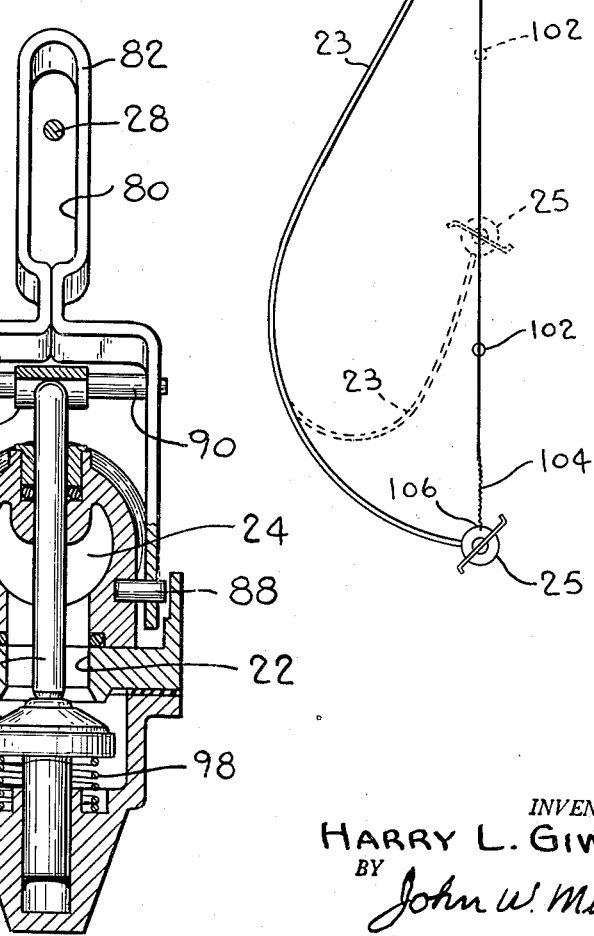
INVENTOR.
HARRY L. GIWOSKY
BY John W. Michael
ATTORNEY

2,958,470

DEVICE FOR MOVING IRRIGATING UNITS

Harry L. Giwosky, Milwaukee, Wis., assignor, by mesne assignments, to Realist, Inc., Menomonee Falls, Wis., a corporation of Delaware Filed Sept. 22, 1958, Ser. No. 762,557

2 Claims. (Cl. 239—189)

This invention relates to irrigation of lawns and the like and primarily to a device for moving the irrigating unit such as a lawn sprinkler.

In the last few years there has been a growing tendency towards use of so-called travelling lawn sprinklers which are designed to propel themselves along the ground as they distribute water over the adjacent area. These devices have not proven thoroughly satisfactory in that the hydraulically driven drive mechanism frequently stalled and, furthermore, the devices travel too fast to lay down an adequate coverage of water in the area to be irrigated. The latter defect can, of course, be overcome by changing the drive speed but the former objection seems to be somewhat inherent in the mechanism. Be that as it may, this approach is considered uneconomic in that it results in a very costly unit designed to replace the lawn sprinkling devices already owned by the purchaser.

The principal object of the present invention is to provide a low-cost device for moving lawn sprinklers or other irrigating devices.

Another shortcoming of the self-travelling lawn sprinkler is that it either does not shut off the water or the shut off point can only occur when the sprinkler reaches a certain predetermined, non-adjustable position with respect to a trip device. A further object of this invention is to provide a device of the character described provided with means of turning off the water supply which means can be set to turn off the supply when the sprinkling device has reached any desired position with respect to the control.

A further object of this invetnion is to provide a device for moving a lawn sprinkler which device permits utilization of existing or previously owned sprinkling devices and hoses and the like, thus providing a lawn sprinkler moving device which does not involve obsoleting present equipment of the purchaser and which, therefore, can provide the purchaser with the benefit of a moving lawn sprinkler at very low cost.

Other objects and advantages will be pointed out in, or be apparent from, the specification and claims, as will obvious modifications of the single embodiment shown in the drawings, in which:

Figure 2 is a vertical section taken on line 2—2 in Figure 1;

Figure 5 is a vertical section on line 5—5 in Figure 4; and

Figure 6 is a general view showing the manner in which the device is used with the dotted line view showing the sprinkler partly reeled in.

Figure 3:
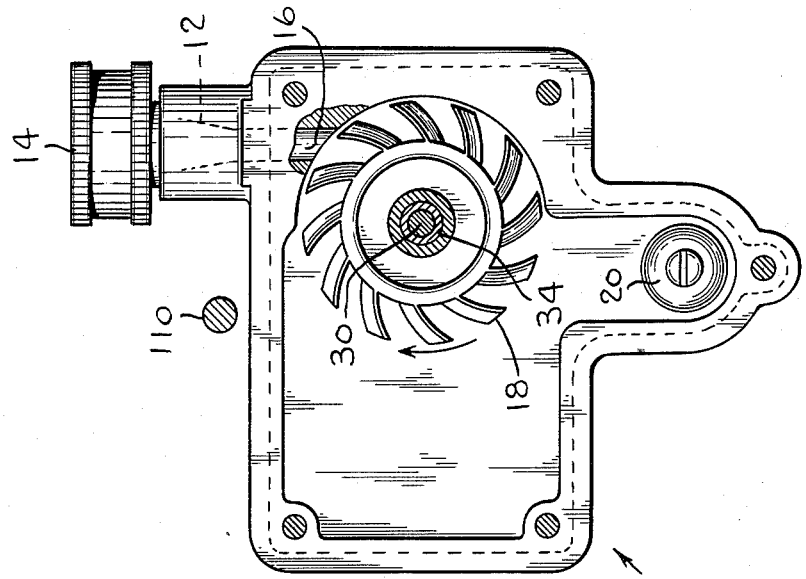
Figure 3 is a horizontal section taken on line 3—3 in Figure 2.
Figure 1:
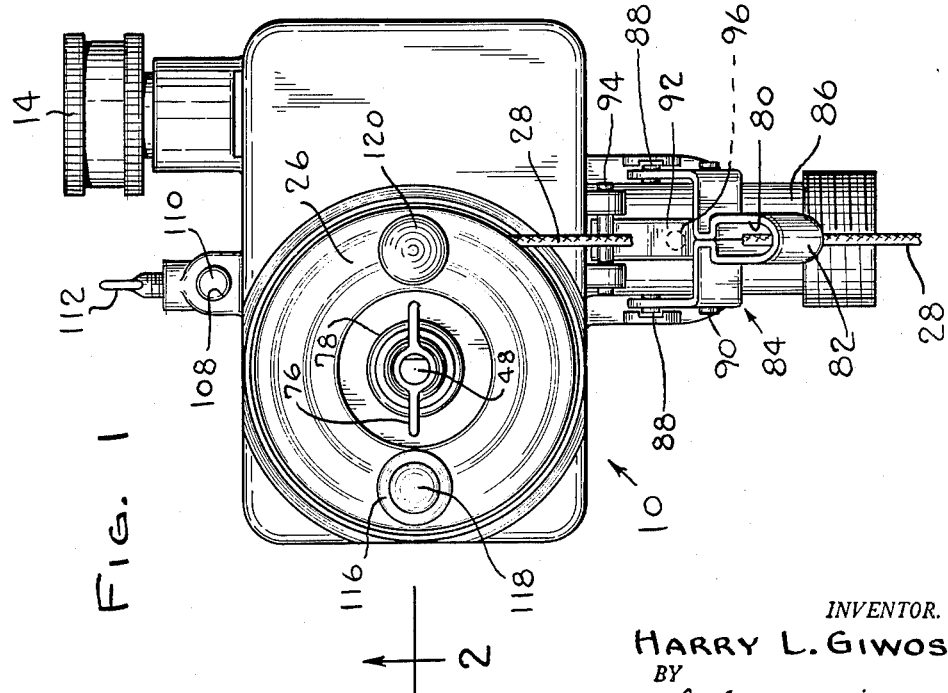
Figure 1 is a plan view of the device.
Figure 4:
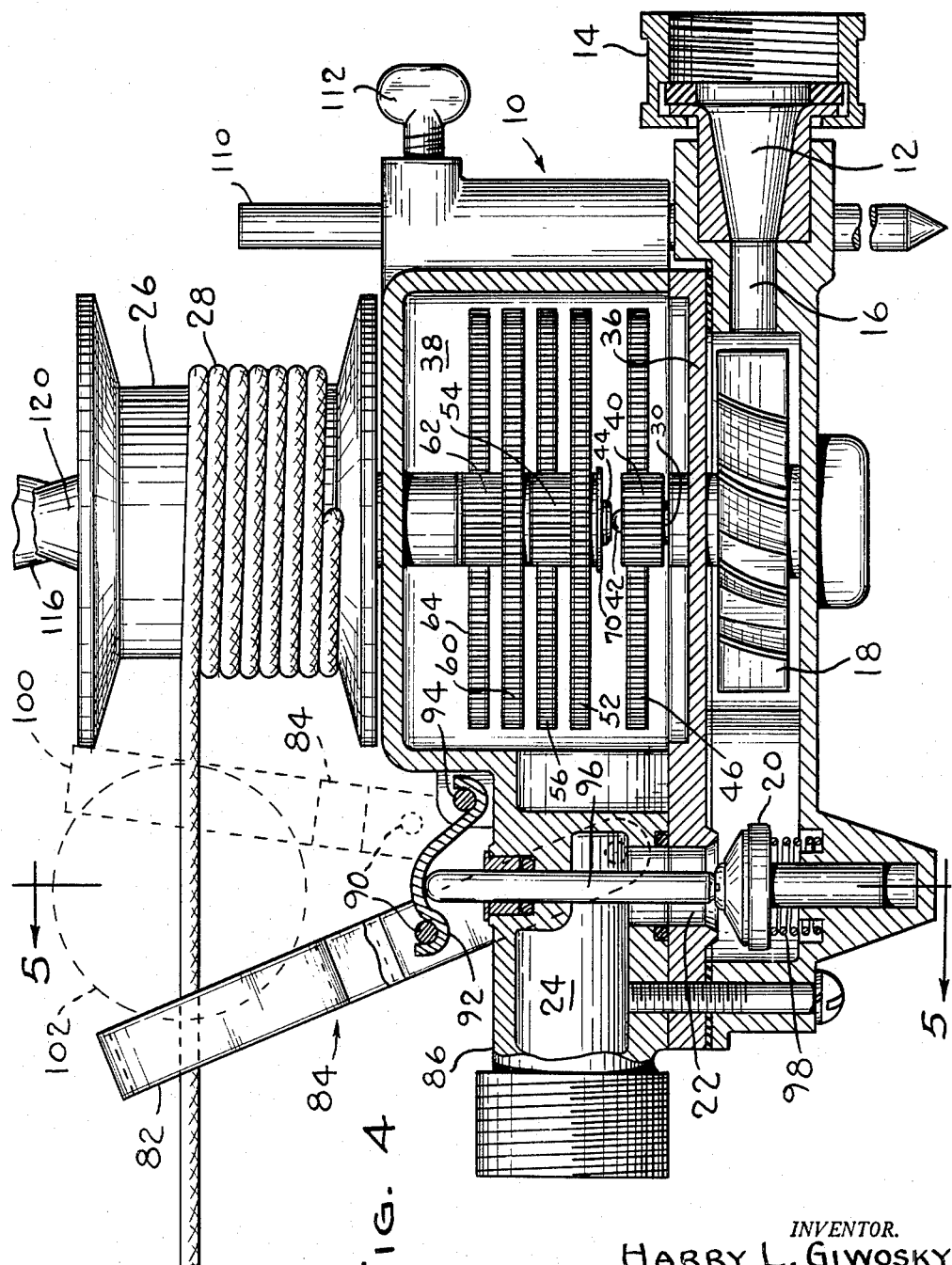
Figure 4 is a vertical section on line 4—4 in Figure 2.

Considering the drawings in detail, the housing 10 has an inlet 12 provided with a female hose coupling 14 to which a hose 15 running from the house hydrant 17 or other source of supply may be connected. The inlet 12 has a converging flow path leading to passage 16 which directs the flow against the blades of water turbine 18 to rotate the turbine at high speed. The flow leaving the turbine goes past valve 20 (assuming the valve is open) through passage 22 to outlet passage 24 which is threaded on the exterior to accept another hose section 23 to which the lawn sprinkler 25 is connected. The turbine drives the drum 26 (by means to be explained more fully hereinafter) to wind up the cord 28 on the drum and cause the end of the cord to be drawn towards the control device. The free end of the cord is secured to the lawn sprinkler.

The turbine is fixed on shaft 30 by set screw 32 and the shaft extends up through bearing 34 in partition 36 to project into chamber 38 where gear 40 is pressed on the upper end of the shaft as shown. The extreme upper end of shaft 30 is provided with a seat for ball 42 which acts against the underside of fixed shaft 44. The force of the water impinging on the turbine exerts an axial force on shaft 30 tending to lift the shaft and thus ball 42 confines the thrust reaction to virtually a point contact and holds the friction of the turbine at a very minimum. This is extremely important since the turbine has negligible torque even though it is rotating at very high speed. If the thrust is attempted to be taken on a flat surface I have found the turbine will frequently stall. An advantage of the turbine is that there is ample clearance which insures against clogging by sand and the like. This is not true of positive displacement drives such as pistons or gear pump types.

Pinion 40 on the upper end of shaft 30 constitutes the first gear of a gear train giving a very large speed reduction. Thus pinion 40 turns gear 46 which is journalled on shaft 48 along with pinion 50 which, in turn, drives gear 52 journalled on shaft 44 along with pinion 54 which drives gear 56 and pinion 58 journalled on shaft 48. Pinion 58 drives gear 60 journalled on shaft 44 with pinion 62 which drives gear 64 fixed on shaft 48 and constituting the last gear in the drive. Shaft 48 extends up through the top of housing 10 and is journalled on bearing 66 which is threaded on the shaft and pinned thereto.

Before going further into the details of the drive to the drum, it is well to go back over some of the details previously omitted. The upper end of shaft 44 has a press fit in well 68 while the lower end is provided with a D ring 70 which retains the stack of gears on the shaft. Shaft 48 has its lower end journalled in well 71 in partition 36 in the housing while its upper portion is journalled by bearing 66 in the upper wall of the housing. This bearing 66 is threaded on the shaft as previously stated. Also threaded on the shaft is plate 72 which is made of bearing material. Immediately above plate 72 is a neoprene disc 74 which is loose on the shaft 48 and which is adapted to act as a clutch when the wing nut 76 on the top of shaft 48 is tightened to bear against the drum 26 through the D washer 78 to force the drum down against the neoprene disc and against the drive plate 72. The underside of the drum and the upper surface of the drive plate are serrated and, hence, bite into the neoprene disc and complete the drive from the shaft 48 to the drum. If the wing nut 76 is backed off, the drum can be rotated freely with respect to the shaft 48 and this permits cord wound on the drum to be freely stripped off the drum for purposes which will be appreciated more fully hereinafter.

The gear train shown here provides approximately 4000 to 1 reduction and results in a very considerable force being applied to the drum so the cord can exert a very large force on the sprinkler to pull the sprinkler back towards the control with very little likelihood of it becoming stalled. Indeed, this force conservatively runs in the neighborhood of 35 pounds which is more than enough to pull a sprinkler and a considerable amount of hose.

From the description thus far it will be appreciated that water enters the housing through conduit 12, passes through the turbine 18 and then flows past valve 20 and out outlet 24 to which the hose which supplies the water sprinkler is connected. The force acting on the turbine tends to lift the turbine so that the shaft presses ball 42 against the lower end of shaft 44 fixed in chamber 38 of the housing. This insures a minimum of friction for the turbine and pinion 40 drives through the gear train to the drum to wind up the cord 28. The drum 26 is effectively clutched to the drive shaft 48 through the plate 72 and the neoprene disc 74. This clutch can be disengaged by backing off the wing nut 76 to permit the drum to rotate freely and thus permit the cord to be freely stripped from the drum without necessitating rotation of all the gearing.

The cord 28 passes from drum 26 through the opening 80 in the upwardly projecting handle 82 of lever 84 pivotally mounted to the outlet housing extension 86 by pins 88—88. The lever 84 is provided with a cross pin 90 which is adapted to rest on the lever actuating arm 92 pivoted on pin 94. This arm acts on the valve actuating pin 96 to act against the end of valve 20 to open the valve against the bias of spring 98 when the pin is moved downward. In order to establish flow it is, of course, necessary to open the valve and this is accomplished by moving the lever from the dotted line position 100 to the full line position illustrated where the pin 90 cams the arm 92 downwardly to open the valve. The pin then drops into the grooved end of arm 92 to retain the lever in the full line position and, thus, hold the valve open. The cord is provided with a trip disc 102 having spaced holes through which the cord passes. The disc 102 on the cord 28 is, of course, easily adjusted along the length of the cord by holding the cord and sliding the disc therealong. However, if the force is put on the cord and the disc 102 is held stationary, the cord will grip the disc and pull the disc. This is utilized to actuate the lever 84 when it is desired to shut off the flow of water. Thus the disc is placed along the length of the cord so that it will be at the lever 84 when the sprinkler has reached the point at which it is desired to shut off the flow of water. At this time, continued rotation of the drum will pull the disc 102 against the lever and move the lever from the solid line position to the dotted line position, the latter portion of this motion actually being accomplished with a snap action as the pin 90 engaging arm 92 passes over the point of increasing force whereupon the valve spring 98 can close valve 20. It will be noted that the water pressure aids in maintaining the valve 20 closed. It will be appreciated that this arrangement provides complete flexibility in determining at what point the water will be turned off. Most travelling sprinklers have either no provision for turning off the water or can only turn off the water when the sprinkler itself reaches a predetermined point with respect to an additional control and there is no way of varying this condition.

The end of the cord could, of course, be tied directly to a sprinkler but this would cause considerable wear on the cord and it is preferred to provide the end of the cord with the light chain 104 and the S hook 106 on the end of the chain for facilitating easy connection to a sprinkler. It will be appreciated that under certain conditions the force on the drum would tend to move the control just as readily as it might tend to move the sprinkler and to overcome this tendency, the housing is provided with a vertical hole 108 through which the stake 110 can be passed and driven into the ground and retained thereby by set screw 112. This, of course, anchors the control and insures movement of the sprinkler instead of the control.

A few further relatively minor details should be pointed out. The drum is, as can be seen in the drawing, made of two cast sections which permit utilization of a hollow drum. The lower section is provided with an aperture 114 through which the cord is passed and knotted to retain the cord on the drum and insure better levelling of the cord on the drum as it winds up. The cord is also provided with a handle or knob 116 which is rotatable on pin 118 and is utilized for winding up the cord manually when desired. The upstanding boss 120 is helpful in some circumstances when manipulating the wing nut 76. Reference to the drawings will readily demonstrate the housing 10 is made up of a plurality of cast parts interconnected by suitable screws and having suitable gaskets between the parts. Similarly, where the shafts are brought out of the housing there are suitable gaskets provided to prevent leakage. All of these details have nothing to do with the invention here and, hence, need not be described in detail.

Although but one embodiment of the present invention has been illustrated and described, it will be apparent to those skilled in the art that various changes and modifications may be made therein without departing from the spirit of the invention or from the scope of the appended claims.

I claim:

1. A control for moving an irrigation device comprising, a housing having an inlet and an outlet and a conduit therebetween, power means driven by the water flowing through the conduit, a drum mounted on the housing, means interconnecting the power means and the drum for rotating the drum, a cord connected to the drum and adapted to be wound thereon as the drum rotates under power, said interconnecting means including clutch means permitting the drum to be rotated freely, said clutch means including, a shaft driven by the power means, the drum being mounted on the shaft for axial movement thereon, a drive plate fixed on the shaft and adapted to drive the drum when the drum is moved towards the plate, and means for locking the drum for driving by the plate or freeing the drum.

2. A control for moving an irrigation device comprising, a housing having an inlet and an outlet and a conduit therebetween, power means driven by the water flowing through the conduit, a drum mounted on the housing, means interconnecting the power means and the drum for rotating the drum, said outlet being connected to a sprinkler hose independently of the drum, a cord connected to the drum and adapted to be wound thereon as the drum rotates, under power, valve means in the conduit for regulating flow through the housing, a spring biasing the valve closed with inlet pressure adapted to aid in holding the valve closed, an arm operatively connected to the valve to open the valve against the bias of the spring, a lever acting on the arm and movable between one position in which the valve is closed and another position in which the valve is open, the arm and lever coacting to require force to move the lever from either position to the other, the lever having a hole therethrough which the cord passes, and means on the cord to engage and move the lever from said other position to said one position.

References Cited in the file of this patent

UNITED STATES PATENTS

| 1,142,448 | Lord | June 8, 1915 |
| 1,176,856 | Salmond | Mar. 28, 1916 |
| 1,714,713 | Farley | May 28, 1929 |
| 2,518,990 | Keener | Aug. 15, 1950 |
| 2,660,471 | Egly | Nov. 24, 1953 |

FOREIGN PATENTS

| 635,424 | Great Britain | Apr. 12, 1950 |